(12) United States Patent
El Mallawany et al.

(10) Patent No.: US 11,280,417 B2
(45) Date of Patent: Mar. 22, 2022

(54) CHEMICAL INJECTION SYSTEM WITH JAY-SELECTOR

(71) Applicant: Halliburton Energy Services, Inc., Houston, TX (US)

(72) Inventors: Ibrahim El Mallawany, Spring, TX (US); Paul Gregory James, Spring, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 272 days.

(21) Appl. No.: 16/485,375

(22) PCT Filed: Feb. 12, 2019

(86) PCT No.: PCT/US2019/017714
§ 371 (c)(1),
(2) Date: Aug. 12, 2019

(87) PCT Pub. No.: WO2019/177730
PCT Pub. Date: Sep. 19, 2019

(65) Prior Publication Data
US 2020/0116269 A1   Apr. 16, 2020

Related U.S. Application Data

(60) Provisional application No. 62/642,315, filed on Mar. 13, 2018.

(51) Int. Cl.
*F16K 11/00* (2006.01)
*F16K 15/18* (2006.01)
*E21B 34/16* (2006.01)
*F16K 1/52* (2006.01)
*F16K 15/02* (2006.01)

(52) U.S. Cl.
CPC .......... *F16K 15/1826* (2021.08); *E21B 34/16* (2013.01); *F16K 1/52* (2013.01); *F16K 15/025* (2013.01)

(58) Field of Classification Search
CPC .... F16K 15/1826; F16K 15/025; E21B 34/16; E21B 34/10; E21B 37/06
See application file for complete search history.

(56) References Cited

U.S. PATENT DOCUMENTS 6,247,536 B1 * 6/2001 Leismer ................ E21B 34/066
166/305.1
6,491,102 B2 * 12/2002 Leismer ................ E21B 34/066
166/316

(Continued)

FOREIGN PATENT DOCUMENTS

WO    2018236368 A1    12/2018

OTHER PUBLICATIONS

International Search Report and Written Opinion dated Jun. 14, 2019; International PCT Application No. PCT/US2019/017714.

*Primary Examiner* — Reinaldo Sanchez-Medina
(74) *Attorney, Agent, or Firm* — McGuireWoods LLP

(57) ABSTRACT

Systems for chemical injection. An example system includes a pilot valve comprising: a hydraulic piston, a poppet, and a biasing device. The system further comprises a jay-selector comprising: a rotatable jay-piston having jay-slots, and a plurality of ports. The system additionally comprises a plurality of flow restrictors.

20 Claims, 4 Drawing Sheets

(56) References Cited

U.S. PATENT DOCUMENTS

| | | | |
|---|---|---|---|
| 6,502,640 B2* | 1/2003 | Rayssiguier | E21B 23/006 |
| | | | 166/375 |
| 7,730,953 B2 | 6/2010 | Casciaro | |
| 8,776,897 B2* | 7/2014 | Vaghi | E21B 34/10 |
| | | | 166/375 |
| 9,388,664 B2 | 7/2016 | Teale et al. | |
| 2007/0163774 A1* | 7/2007 | Hosatte | E21B 34/06 |
| | | | 166/66.6 |
| 2009/0065218 A1 | 3/2009 | Loretz et al. | |
| 2011/0100645 A1* | 5/2011 | Yapici | E21B 23/04 |
| | | | 166/375 |
| 2012/0318367 A1* | 12/2012 | Going | E21B 37/06 |
| | | | 137/12 |
| 2013/0048303 A1* | 2/2013 | Patel | E21B 43/16 |
| | | | 166/373 |
| 2014/0246246 A1 | 9/2014 | Radford | |
| 2016/0273321 A1 | 9/2016 | Frosell et al. | |
| 2019/0071960 A1* | 3/2019 | James | E21B 34/00 |

\* cited by examiner

CHEMICAL INJECTION SYSTEM WITH JAY-SELECTOR

TECHNICAL FIELD

The present disclosure relates to chemical injection systems, and more particularly, to chemical injection systems comprising a jay-selector to select a desired chemical injection flow rate range to meet a target flow requirement for an injected chemical while maintaining system back pressure in an acceptable range.

BACKGROUND

During some wellbore operations, it may be beneficial to inject chemicals into the annulus and/or wellbore. For example, these chemicals may optimize fluid production and minimize well downtime and expensive intervention. Chemical injection systems may be used to inject said chemicals. Some chemical injection systems may have issues with a U-tube effect should the hydrostatic pressure of the control line be higher than that of the chemical injection location.

One method to mitigate this U-tube effect is to install a high cracking-pressure check or relief valve at the bottom of the injection line. However, this mitigation method is not without drawbacks. One issue is that a minimum flow rate must be maintained in order to keep the valve open. If this minimum flow rate is not maintained, the valve may continuously open and shut resulting in intermittent injection of the chemical. This may also result in premature failure of the high cracking-pressure check or relief valve due to a high number of open and close cycles. Moreover, chemical injection systems must maintain sufficient pressure to support the fluid column, or the injected chemical can boil and become corrosive resulting in damage to the chemical injection system or sealing elements. However, maintaining a sufficiently high pressure may also result in a sudden large pressure drop as the chemical flows through the high cracking-pressure check or relief valve. These sudden large pressure drops in the injected chemical can induce the formation of vapor cavities in the liquid chemical. As the pressure increases as the chemical flows through the high cracking-pressure check or relief valve, the vapor cavities may collapse inducing damage to the high cracking-pressure check or relief valve. This damage may result in premature failure of the high cracking-pressure check or relief valve.

As such, the inability to sufficiently regulate the flow rate and pressure in the chemical injection system can result in damage to the chemical injection system. This damage may potentially result in a loss of operational time and resources.

BRIEF DESCRIPTION OF THE DRAWINGS

Illustrative examples of the present disclosure are described in detail below with reference to the attached drawing figures, which are incorporated by reference herein, and wherein.

The illustrated figures are only exemplary and are not intended to assert or imply any limitation with regard to the environment, architecture, design, or process in which different examples may be implemented.

DETAILED DESCRIPTION

The present disclosure relates to chemical injection systems, and more particularly, to chemical injection systems comprising a jay-selector to select a desired chemical injection flow rate range to meet a target flow requirement for an injected chemical while maintaining system back pressure in an acceptable range.

Figure 1:
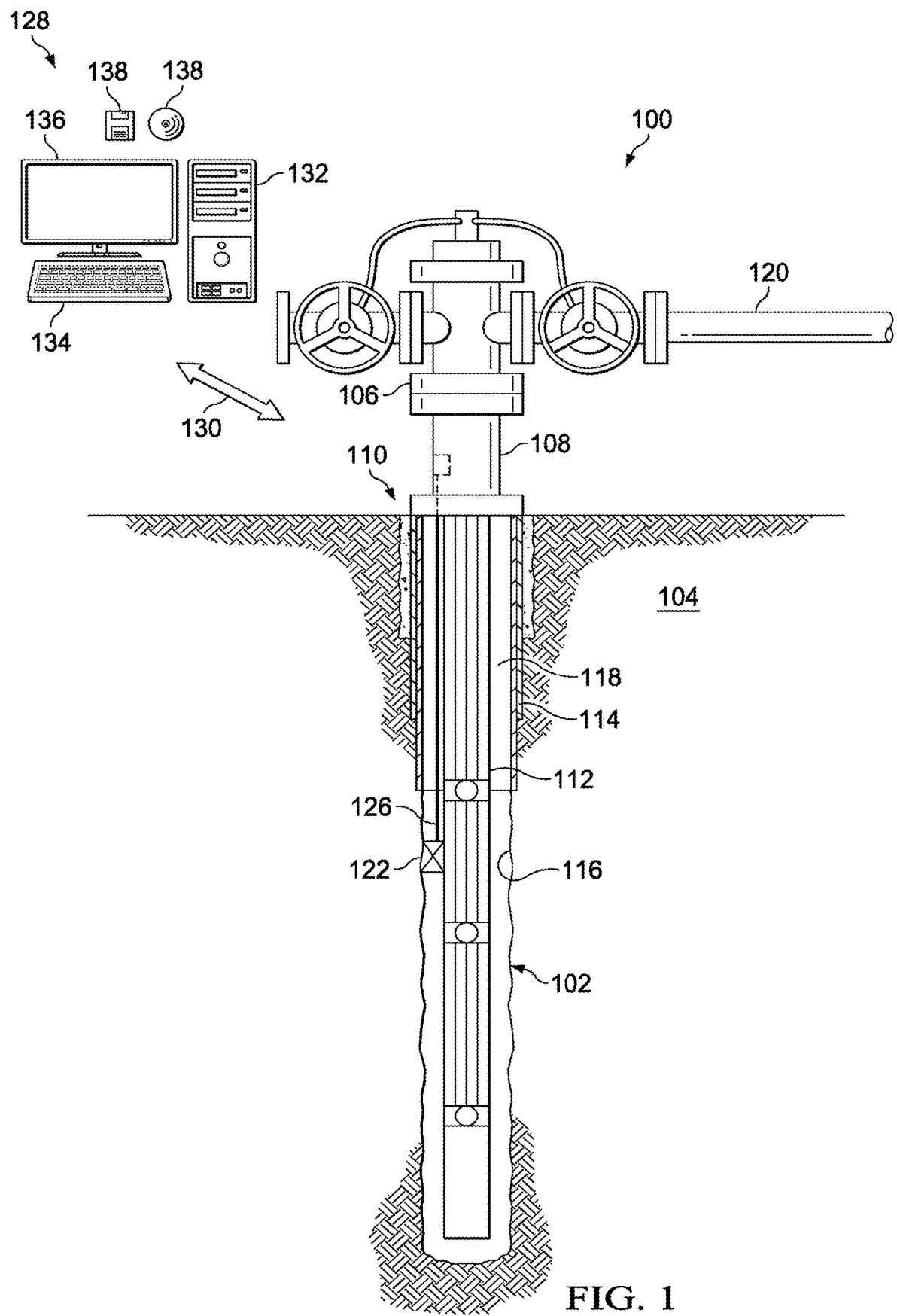
FIG. 1 is a schematic illustrating a production fluid recovery system in accordance with the examples disclosed herein.

FIG. 1 illustrates a production fluid recovery system 100 disposed in a wellbore 102. Production fluid recovery system 100 may comprise a wellbore 102 formed within a subterranean formation 104. Wellbore 102 may be a vertical wellbore, as illustrated, or it may be a horizontal and/or a directional well. While production fluid recovery system 100 may be illustrated as land-based, it should be understood that the present techniques may also be applicable in off-shore applications. Subterranean formation 104 may be made up of several geological layers and include one or more hydrocarbon reservoirs. As illustrated, production fluid recovery system 100 may include a production tree 106 and a wellhead 108 located at a well site 110. A production tubing 112 or a plurality of production tubing 112 may be coupled to production tree 106 and extend from wellhead 108 into wellbore 102, which may traverse the subterranean formation 104.

In some examples, wellbore 102 may be cased with one or more casing segments 114. Casing segments 114 may maintain the structure of wellbore 102 and prevent collapse of wellbore 102. In some examples, a portion of the well may not be cased and may be referred to as "open hole." The space between production tubing 112 and casing segments 114 or wellbore wall 116 may be an annulus 118. Production fluid may enter annulus 118 from subterranean formation 104 and then may enter production tubing 112 from annulus 118. Production tubing 112 may carry production fluid uphole to production tree 106. Production fluid may then be delivered to various surface facilities for processing via a surface pipeline 120.

In some examples, wellbore 102 may be separated into a plurality of zones and may comprise any number of various tools that may help in the recovery of production fluids from subterranean formation 104. As disclosed, production fluid recovery system 100 may comprise chemical injection system 122. Chemical line 126 may provide fluid to be disposed in annulus 118, wellbore 102, and/or production tubing 112. Fluids may be utilized for scale, asphaltenes, emulsions, hydrates, defoaming, paraffin, scavengers, corrosion, demulsifiers, and/or the like. Fluids may flow at any desired rate from the surface through chemical injection system 122 to annulus 118, wellbore 102, and/or production tubing 112. In examples, chemical injection system 122 may connect to wellhead 108 through a chemical line 126 which may be controlled by information handling system 128. In some examples, there may be a plurality of chemical lines 126. Communication line 130 may connect information handling system 128 to chemical line 126. Communication line 130 may be a wired communication and/or wireless communication.

Information handling system 128 may include any instrumentality or aggregate of instrumentalities operable to compute, estimate, classify, process, transmit, receive, retrieve, originate, switch, store, display, manifest, detect, record, reproduce, handle, or utilize any form of information, intelligence, or data for business, scientific, control, or other purposes. For example, information handling system 128 may be a personal computer 132, a network storage device, or any other suitable device and may vary in size, shape, performance, functionality, and price. Information handling system 128 may include random access memory (RAM), one or more processing resources such as a central processing unit (CPU) or hardware or software control logic, ROM, and/or other types of nonvolatile memory. Additional components of information handling system 128 may include one or more disk drives, one or more network ports for communication with external devices, as well as various input and output (I/O) devices such as a keyboard 134, a mouse, and a video display 136. Information handling system 128 may also include one or more buses operable to transmit communications between the various hardware components.

Alternatively, systems and methods of the present disclosure may be implemented, at least in part, with non-transitory computer-readable media. Non-transitory computer-readable media may include any instrumentality or aggregation of instrumentalities that may retain data and/or instructions for a period of time. Non-transitory computer-readable media may include, for example, without limitation, storage media such as a direct access storage device 138 (e.g., a hard disk drive or floppy disk drive), a sequential access storage device (e.g., a tape disk drive), compact disk, CD-ROM, DVD, RAM, ROM, electrically erasable programmable read-only memory (EEPROM), and/or flash memory; as well as communications media such as wires, optical fibers, microwaves, radio waves, and other electromagnetic and/or optical carriers; and/or any combination of the foregoing.

Figure 2:
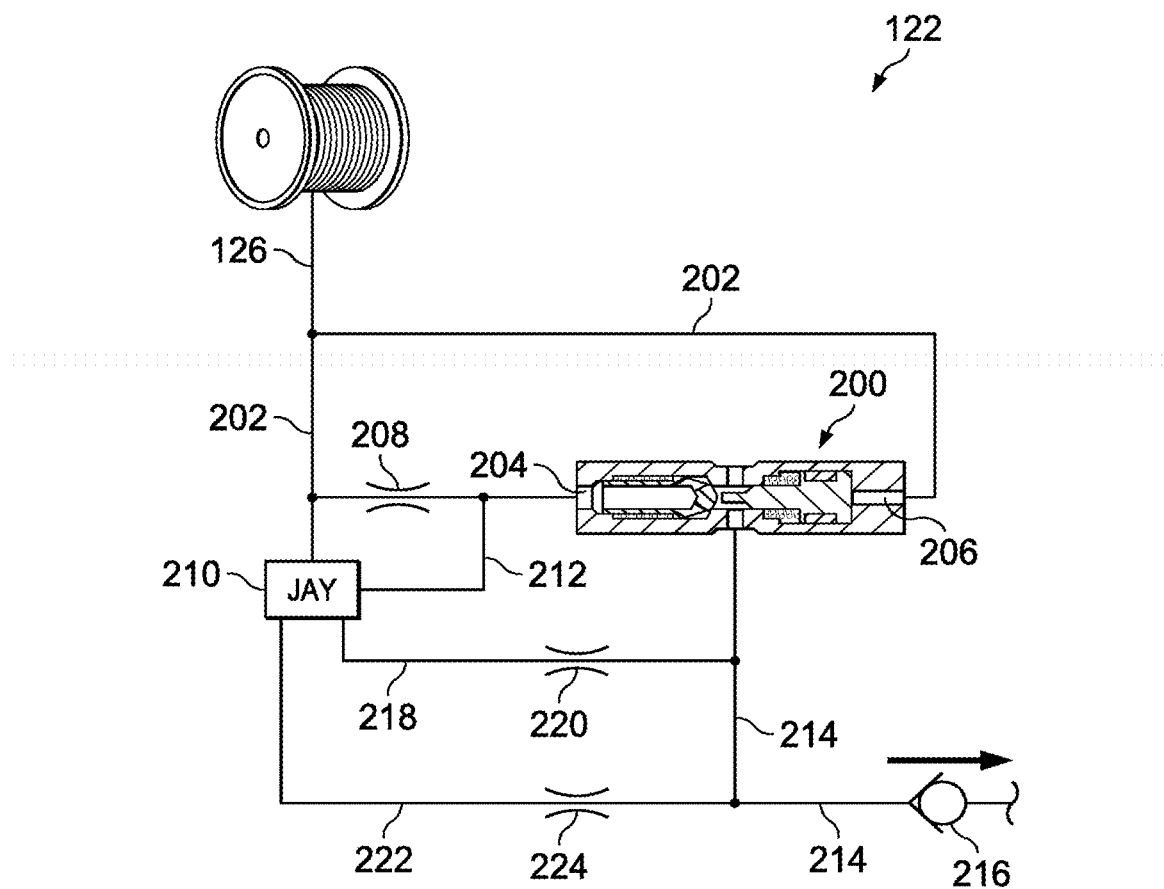
FIG. 2 is a schematic illustrating a chemical injection system in accordance with the examples disclosed herein.

FIG. 2 is a schematic illustrating an example chemical injection system 122. Chemical injection system 122 comprises a pilot valve 200 discussed in detail in FIG. 3 below. A chemical line 126 branches into chemical line branches 202 that are connected to a pilot valve 200 at the poppet side 204 and the pilot side 206 (discussed in FIG. 3 below). A first flow restrictor 208 is connected in line with the poppet side 204. When the chemical line 126 and the chemical line branches 202 are first pressured, there is no flow through the pilot valve 200, as the spring is pushing the poppet of the pilot valve 200 closed. As pressure builds, the area that the pressure is acting on, the surface of the hydraulic piston in the pilot side 206, is larger than the area the pressure is acting on, on the poppet side 204, and at a certain pressure the force acting on the hydraulic piston 206 becomes larger than the force acting on the poppet side plus the spring force which causes the poppet to open, resulting in a drop in the pressure acting on the poppet in the poppet side 204. As such, only the spring force of the spring in the poppet side 204 is left to close the valve. Therefore the differential pressure required to open the valve is larger than the differential pressure required to close the valve. When the pilot valve 200 is open, fluid may flow through the poppet side 204 into the injection line 214.

When pilot valve 200 is open, flow through the first flow restrictor 208 creates a pressure differential across first flow restrictor 208. This pressure differential actuates the jay-selector 210 (discussed in FIGS. 4A-4C below) by building pressure within one side of the jay-selector 210 vs the side that is connected to line 212 which strokes the jay-piston within the jay-selector 210. Jay-selector line 212 is a vent or balance line for the jay selector mechanism and allows the internal jay-piston with the jay-profile to move freely back and forth. Actuation of the jay-selector 210 at this stage does not open any additional flow paths. Flow then proceeds only through the restrictor 208 and pilot valve 200 through the injection line 214 and through the backflow prevention valve 216 discussed below.

When flow is halted, injection line 214 may have a higher hydrostatic pressure than that from annulus 118, wellbore 102, and/or production tubing 112 (as illustrated in FIG. 1 above) which forms a U-tube effect. Thus, pressure and fluid from the control line 214 may try to migrate into annulus, wellbore, tubing, To prevent the "U-tube" effect, the pilot valve 200 may be designed to have a high cracking pressure by adjusting the area ratio between sides 206 and 204 as well as the spring force.

Back flow prevention valve 216 prevents any fluid from annulus, tubing, wellbore to enter injection line 214

When the injection pressure is decreased sufficiently, the pilot valve 200 closes. This occurs when the pressure acting on the hydraulic piston within the pilot side 206 is reduced to a pressure lower than that of the spring force of the spring acting on the poppet within the poppet side 204 of the pilot valve 200. Closure of the pilot valve 200 allows the pressure across the jay selector to equalize therefore the spring within the jay-selector 210 returns the jay-piston within the jay-selector 210 from its stroked position. However, due to rotation of the jay-piston (discussed below) the return stroke is not to the same position the jay-piston was in prior to actuation of the jay-selector 210.

When the chemical line 126 and the chemical line branches 202 are pressured again to open pilot valve 200, the jay-selector 210 may be actuated a second time. This second stage actuation allows fluid flow through a jay-selector line 218. The total flow through the chemical injection system 122 is increased because an additional flow path to the injection line 214 is opened. A second flow restrictor 220 is disposed on the second jay-selector line 218 to control flow pressure to the injection line 214 from the second jay-selector line 218.

When the injection pressure is decreased sufficiently, the pilot valve 200 closes as discussed above. Closure of the pilot valve 200 allows the spring with the jay-selector 210 to return the jay-piston within the jay-selector 210 from its stroked position. However, due to rotation of the jay-piston (discussed below), this second return stroke is not to the same position the jay-piston was in prior to actuation of the jay-selector 210 to open the jay-selector line 218.

When the chemical line 126 and the chemical line branches 202 are pressured again to open pilot valve 200, the jay-selector 210 may be actuated a third time. This third stage actuation allows fluid flow through the jay-selector line 218 as discussed above, as well as through the jay-selector line 222. The total flow through the chemical injection system 122 is increased because an additional flow path to the injection line 214 is opened. A third flow restrictor 224 is disposed on the jay-selector line 222 to control flow pressure to the injection line 214 from the jay-selector line 222.

When the injection pressure is decreased sufficiently, the pilot valve 200 closes as discussed above. Closure of the pilot valve 200 allows the spring with the jay-selector 210 to return the jay-piston within the jay-selector 210 from its stroked position. However, due to rotation of the jay-piston (discussed below), this third return stroke is not to the same position the jay-piston was in prior to actuation of the jay-selector 210 to open the jay-selector line 222.

With continued reference to FIG. 2, it is to be understood that although three flow restrictors and three jay-selector lines are illustrated, any number of flow restrictors and jay-selector lines may be used as desired. As such, the chemical injection system 122 comprises a plurality of flow restrictors and a plurality of jay-selector lines as would be readily apparent to one of ordinary skill in the art with the benefit of this disclosure.

The flow restrictors, e.g., first flow restrictor 208, second flow restrictor 220, third flow restrictor 224, etc. may be any such flow restrictor sufficient for restricting flow therethrough. Examples of flow restrictors may include, but are not limited to, single orifice restrictors, multi orifice restrictors, fluidic devices or other flow regulating devices, or any combinations thereof. In addition, the restrictor orifice(s) may be a tortuous path to maximize orifice diameter in order to minimize the risk of the flow restrictors becoming plugged. The flow restrictors may be configurable to allow any desired flow rate within the chemical injection system 122.

Figure 3:
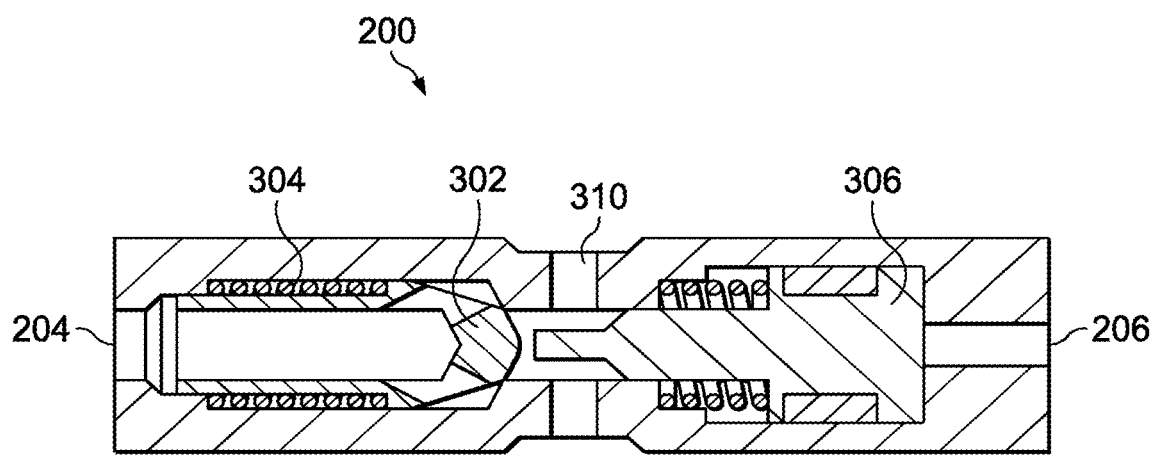
FIG. 3 is a cross-section illustrating a pilot valve in accordance with the examples disclosed herein.

FIG. 3 is a schematic illustrating pilot valve 200. As discussed above, pilot valve 200 comprises a poppet side 204 and a pilot side 206. The poppet side 204 comprises a poppet 302 and a spring 304. The pilot side 206 comprises a hydraulic piston 306. The pilot valve 200 further comprises a port 310 where fluid may flow into injection line 214 as discussed above. Pilot valve 200 opens with a higher pressure than the pressure required to close it. When pressure is first applied to the pilot valve 200, as discussed above, both the poppet side 204 and the pilot side 206 may experience equal pressure acting thereon. The pilot side 206 is designed such that the hydraulic piston 306 has a larger cross-sectional area than the poppet 302 of the poppet side 204. This difference in cross-sectional area allows the pilot valve 200 to open at a specific pressure (also dependent upon the stiffness of the spring 304 acting to close the valve). For example, assuming that the pilot side 206 has a cross-sectional area of 0.1 in$^2$ and the poppet side 204 has a cross-section area of 0.05 in$^2$ and the spring force of spring 304 is 100 lbs., when 2000 psi (above wellbore pressure) of pressure is applied, the pilot side 206 will exert a force of 200 lbs. trying to open the pilot valve 200, and the poppet side 204 will exert a force of 100 lbs. trying to close the pilot valve 200. As the spring 304 is also exerting a force of 100 lbs. trying to close the valve, the valve is balanced. However, any slight increase in pressure above the 2000 psi will cause the pilot valve 200 to open by the hydraulic piston 306, unseating the poppet 302.

Once the pilot valve 200 opens, the pressure on the poppet side 204 drops to about 0 psi (above wellbore pressure). Therefore, the only force remaining to close the pilot valve 200 is the spring 304. Thus, in order for the pilot valve 200 to close, the pressure applied on the pilot side 206 must drop below that of the spring force of the spring 304. The values used to open and close the pilot valve 200 may be adjusted as desired by adjusting the ratio of the cross-sectional areas of the poppet 302 to the cross-sectional areas of the hydraulic piston 306. Additionally, the spring force of the spring 304 may also be adjusted as desired. As such, the pilot valve 200 can be designed to open and close at specific pressures as desired.

Figure 4A:
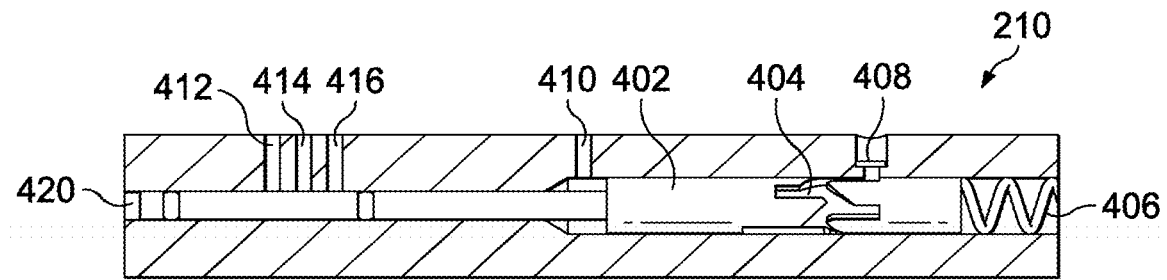
FIG. 4A is a cross-section illustrating a jay-selector during operation in accordance with the examples disclosed herein.
Figure 4B:
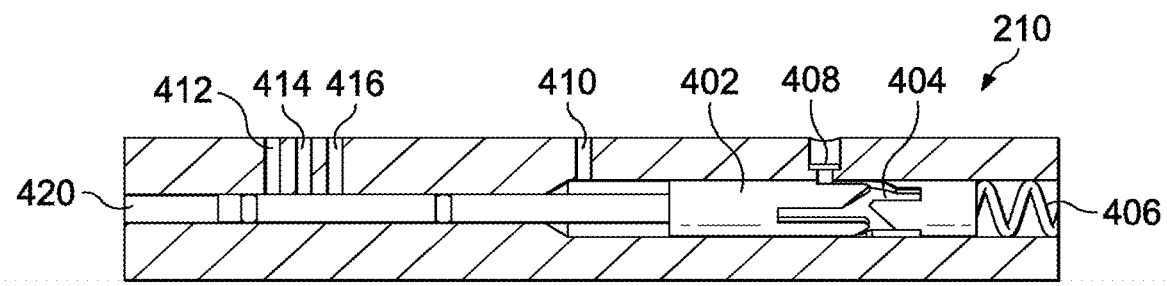
FIG. 4B is another cross-section illustrating a jay-selector during operation in accordance with the examples disclosed herein.
Figure 4C:
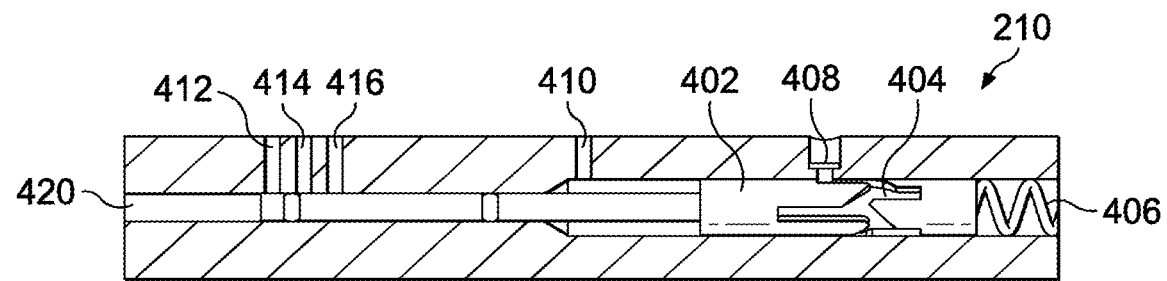
FIG. 4C is an additional cross-section illustrating a jay-selector during operation in accordance with the examples disclosed herein.

FIGS. 4A-4C are schematics illustrating the jay-selector 210. Jay-selector 210 comprises a jay-piston 402. The jay-piston 402 comprises jay-slots 404 along an exterior surface of the jay-piston 402. The jay-selector 210 further comprises a spring 406, guide 408, and a plurality of ports 410, 412, 414, 416, and 420. Spring 406 is adjacent to the jay-piston 402 and acts on the jay-piston 402 to push jay-piston 402 to the left-most position illustrated in FIGS. 4A-4C. Said left-most position closes ports 412, 414, and 416 from the fluid inlet port 420. Guide 408 is fixed in jay-selector 210 and comprises a portion disposed in the jay-slots 404 of the jay-piston 402. As illustrated, upon a sufficient pressure differential formed across the first flow restrictor (e.g., first flow restrictor 208 as illustrated in FIG. 2), the jay-piston 402 is actuated from increasing pressure applied through port 420 from the chemical injection line (202 in FIG. 2) and is stroked to the right, compressing spring 406. Fluid passes through port 410 to balance the jay-selector mechanism and allow free movement. Port 410 is coupled to jay-selector line 212 as discussed above in FIG. 2. Shifting the jay-piston 402 also entails moving the guide 408 in the illustrated jay-slots 404. The shape and curvature of the jay-slots 404 of the jay-piston 402 result in the rotation of the jay-piston 402, as the fixed guide 408 is slid within the curved jay-slots 404. As one of the terminal ends of the jay-slots 404, specifically the terminal end farthest from spring 406 has different lengths for each respective jay-slot 404, the return stroke of the jay-piston 402 rotates the jay-piston by translation of the fixed guide 408 into a different jay-slot 404, locking the jay-piston 402 in a different position for each actuating stroke.

With continued reference to FIG. 4A, when there is no flow, the pilot valve (e.g., pilot valve 200 as illustrated in FIG. 2) is closed, and the pressure differential across the jay-selector 210 is balanced.

FIG. 4B illustrates the jay-piston 402 the first time the pressure is increased after the pilot valve 200 has opened, as discussed above. The jay-piston 402 moves to the right but does not expose any ports. Flow continues through restrictor 208 and pilot valve 200 only.

When flow is stopped, the spring 406 moves the jay-piston 402 to the left with a return stroke. As the jay-piston 402 moves to the left, the jay-piston 402 rotates as discussed above because of the fixed guide 408 sliding within the curved jay-slots 404. However, the jay-piston 402 has rotated to the next jay-slot 404. When the pressure is increased again, the jay-piston moves to the position illustrated in 4C to uncover flow port 412, thereby increasing the flow rate within the same pressure window as compared to the flow rate as was described in FIG. 4B. Flow port 412 is coupled to jay-selector line 218 and therefore opens an additional flow path through jay-selector 210.

This process may be repeated as discussed above by bleeding pressure and pressuring back up to engage incrementally more stages until the jay-piston 402 returns to its original rotational starting point, and then the whole process can be repeated. The jay-selector 210 may comprise as many ports as there are corresponding jay-selector lines.

Figure 5:
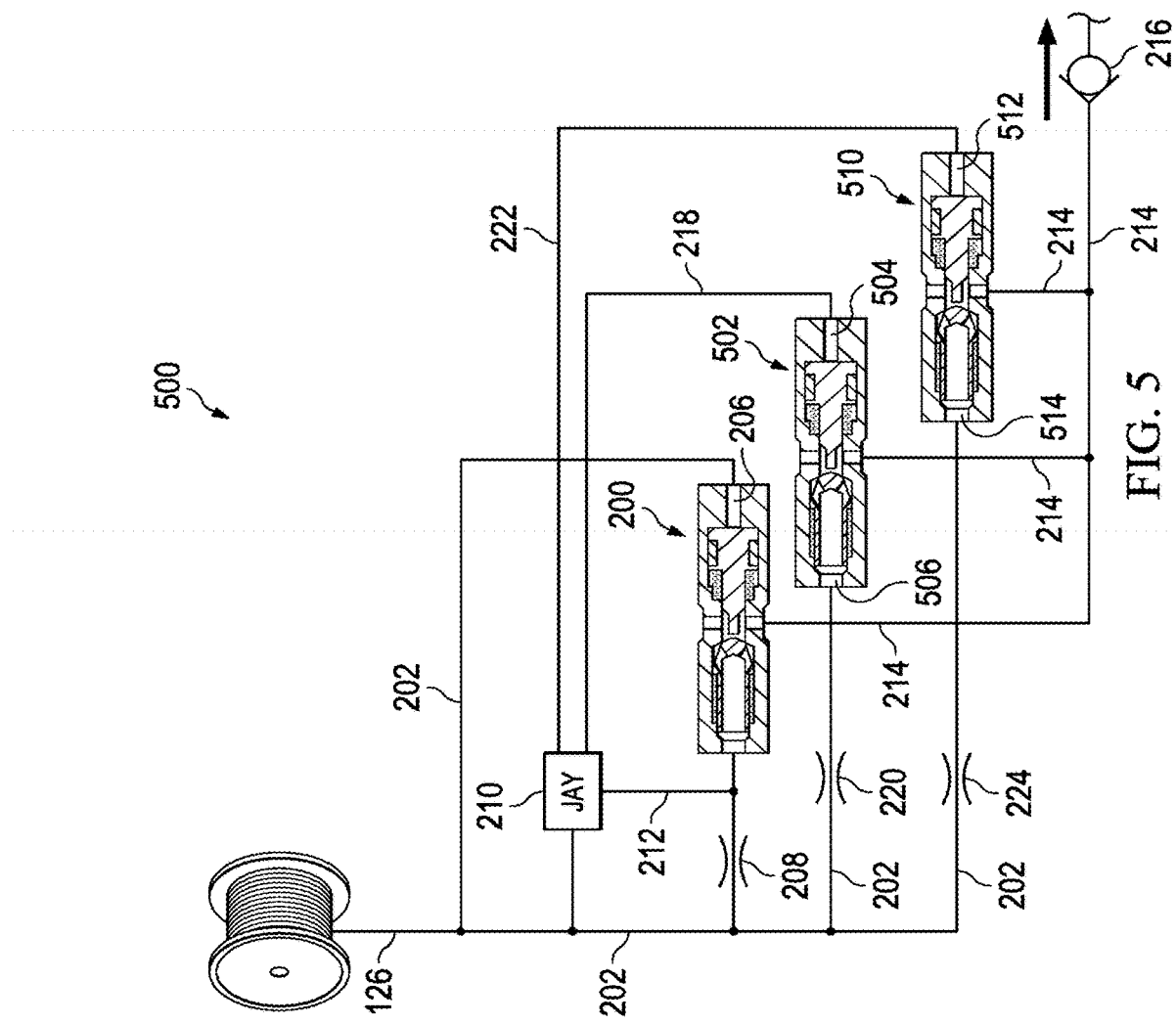
FIG. 5 is a schematic illustrating another chemical injection system in accordance with the examples disclosed herein.

FIG. 5 is an alternative example of a chemical injection system 500. In the example of FIG. 5, flow is controlled with additional pilot valves in addition to the jay-selector 210 on the subsequent stages (i.e. the second, third, fourth stages, etc.), rather than directly to the first flow restrictor 208 and through the jay-selector 210 as discussed in the chemical injection system 122 of FIG. 2 above.

As described in FIG. 2, when the chemical line 126 and the chemical line branches 202 are first pressured, there is no flow as the first pilot valve 200 is closed. As pressure builds, first pilot valve 200 is opened. When pilot valve 200 is open, flow through the first flow restrictor 208 creates a pressure differential across first flow restrictor 208. This pressure differential actuates the jay-selector 210 by building pressure within one side of the jay-selector 210 to stroke the jay-piston within the jay-selector 210 as discussed in FIGS. 4A-4C. Actuation of the jay-selector 210 at this stage only allows flow through restrictor 208. Flow then proceeds through the injection line 214 and through the backflow prevention valve 216 as discussed above.

When the injection pressure is decreased sufficiently, the pilot valve 200 closes as described above in FIG. 2. Closure of the pilot valve 200 allows the spring within the jay-selector 210 to return the jay-piston within the jay-selector 210 from its stroked position. However, due to rotation of the jay-piston (as discussed in FIGS. 4A-4C) the return stroke is not to the same position the jay-piston was in prior to actuation of the jay-selector 210.

When the chemical line 126 and the chemical line branches 202 are pressured again to open pilot valve 200, the jay-selector 210 may be actuated again. This second stage actuation allows the fluid flow to open second pilot valve 502, allowing fluid to flow therethrough. The total flow through the chemical injection system 500 has been increased because an additional flow path to the injection line 214 is opened. However, this second stage of chemical injection system 500 differs from the second stage of the chemical injection system 122 of FIG. 2 in that the jay-selector line 218 flows to the pilot side 504 of the second pilot valve 502. This fluid flow applies pressure to the hydraulic piston of the pilot side 504 of the second pilot valve 502 to open the second pilot valve 502. Flow to the poppet side 506 occurs via another chemical line branch 202 having a second flow restrictor 220 disposed thereon to control flow pressure to the second pilot valve 502. As such, the amount of flow through the jay-selector 210 is reduced compared to FIG. 2, as the jay-selector line 218 is used to merely apply pressure to hold the second pilot valve 502 open, allowing most of the flow for this flow path of the second stage to flow through the poppet side 506 of the second pilot valve 502 instead of through the jay-selector 210.

When the injection pressure is decreased sufficiently, the pilot valve 200 closes as described above in FIG. 2. Closure of the pilot valve 200 allows the spring within the jay-selector 210 to return the jay-piston within the jay-selector 210 from its stroked position. However, due to rotation of the jay-piston (discussed in FIGS. 4A-4C) the return stroke is not to the same position the jay-piston was in prior to actuation of the jay-selector 210.

When the chemical line 126 and the chemical line branches 202 are pressured again to open pilot valve 200, the jay-selector 210 may be actuated again. This third stage actuation allows fluid flow through the jay-selector line 218 and the second pilot valve 502. In addition, this third stage actuation further allows flow through the jay-selector line 222 and a pilot valve 510. As such, total flow through the chemical injection system 500 has been increased as an additional flow path to the injection line 214 has been opened. However, this third stage of chemical injection system 500 differs from the chemical injection system 122 of FIG. 2 in that the jay-selector line 222 flows to the pilot side 512 of the pilot valve 510. This fluid flow applies pressure to the hydraulic piston of the pilot side 512 of the third pilot valve 510 to open the third pilot valve 510. Flow to the poppet side 514 occurs via another chemical line branch 202 having a third flow restrictor 224 disposed thereon to control flow pressure to the third pilot valve 510. As such, the amount of flow through the jay-selector 210 is reduced compared to FIG. 2 with the jay-selector line 222 being used to merely apply pressure to hold the third pilot valve 510 open, allowing most of the flow for this flow path of the third stage to flow through the poppet side 514 of the third pilot valve 510 instead of through the jay-selector 210.

With continued reference to FIG. 5, it is to be understood that although three pilot valves, three flow restrictors, and three jay-selector lines are illustrated, any number of pilot valves, flow restrictors, and jay-selector lines may be used as desired. As such, the chemical injection system 500 comprises a plurality of pilot valves, a plurality of flow restrictors, and a plurality of jay-selector lines as would be readily apparent to one of ordinary skill in the art with the benefit of this disclosure.

Figure 6:
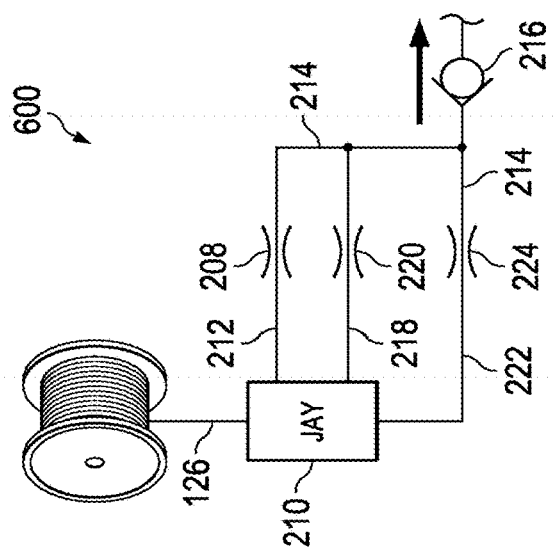
FIG. 6 is a schematic illustrating an additional chemical injection system in accordance with the examples disclosed herein.

FIG. 6 is an alternative example of a chemical injection system 600. In the example of FIG. 6, there are no pilot valves, and flow is directed directly through the jay-selector 210 from the chemical line 126. As such, the spring in the jay-selector 210 (e.g., spring 406 as illustrated in FIGS. 4A-4C) controls the opening pressure of the jay-selector 210 and therefore the flow into the injection line 214.

As illustrated, when pressure builds in chemical line 126 to a sufficient level, the jay-selector 210 is actuated to stroke the jay-piston within the jay-selector 210 as discussed in FIGS. 4A-4C. Actuation of the jay-selector 210 at this stage opens the first jay-selector line 212, allowing flow through the first jay-selector line 212 and a first flow restrictor 208 disposed thereon to control flow pressure to the injection line 214 and the backflow prevention valve 216 discussed above.

When the injection pressure is decreased sufficiently, the spring within the jay selector 210 returns the jay-piston within the jay-selector 210 from its stroked position. However, due to rotation of the jay-piston (discussed in FIGS. 4A-4C) the return stroke is not to the same position the jay-piston was in prior to actuation of the jay-selector 210.

When the chemical line 126 is pressured again, the jay-selector 210 may be actuated again. This second stage actuation allows fluid flow through first jay-selector line 212, as well as through the second jay-selector line 218. The total flow through the chemical injection system 600 is increased because an additional flow path to the injection line 214 has been opened. Second jay-selector line 218 comprises a second flow restrictor 220 disposed thereon to control flow pressure to the injection line 214 and the backflow prevention valve 216 discussed above.

When the injection pressure is decreased sufficiently, the spring within the jay selector 210 returns the jay-piston within the jay-selector 210 from its stroked position. However, due to rotation of the jay-piston (discussed in FIGS. 4A-4C) the return stroke is not to the same position the jay-piston was in prior to actuation of the jay-selector 210.

When the chemical line 126 is pressured again, the jay-selector 210 may be actuated a third time. This third stage actuation allows fluid flow through the first jay-selector line 212, the second jay-selector line 218, as well as through the third jay-selector line 222. The total flow through the chemical injection system 600 is increased because an additional flow path to the injection line 214 has been opened. Third jay-selector line 222 comprises a third flow restrictor 224 disposed thereon to control flow pressure to the injection line 214 and the backflow prevention valve 216 discussed above.

With continued reference to FIG. 6, it is to be understood that although three flow restrictors and three jay-selector lines are illustrated, any number of flow restrictors and jay-selector lines may be used as desired. As such, the chemical injection system 600 comprises a plurality of flow restrictors and a plurality of jay-selector lines as would be readily apparent to one of ordinary skill in the art with the benefit of this disclosure.

It should be clearly understood that the examples illustrated by FIGS. 1-6 are merely general applications of the principles of this disclosure in practice, and a wide variety of other examples are possible. Therefore, the scope of this disclosure is not limited in any manner to the details of FIGS. 1-6 described herein.

It is also to be recognized that the disclosed systems may also directly or indirectly affect the various downhole equipment and tools that may come into contact with the disclosed systems during operation. Such equipment and tools may include, but are not limited to, wellbore casing, wellbore liner, completion string, insert strings, drill string, coiled tubing, slickline, wireline, drill pipe, drill collars, mud motors, downhole motors and/or pumps, surface-mounted motors and/or pumps, centralizers, turbolizers, scratchers, floats (e.g., shoes, collars, valves, etc.), logging tools and related telemetry equipment, actuators (e.g., electromechanical devices, hydromechanical devices, etc.), sliding sleeves, production sleeves, plugs, screens, filters, flow control devices (e.g., inflow control devices, autonomous inflow control devices, outflow control devices, etc.), couplings (e.g., electro-hydraulic wet connect, dry connect, inductive coupler, etc.), control lines (e.g., electrical, fiber optic, hydraulic, etc.), surveillance lines, drill bits and reamers, sensors or distributed sensors, downhole heat exchangers, valves and corresponding actuation devices, tool seals, packers, cement plugs, bridge plugs, and other wellbore isolation devices, or components, and the like. Any of these components may be included in the systems generally described above and depicted in FIGS. 1-6.

Provided are systems for chemical injection. An example system comprises a pilot valve comprising: a hydraulic piston, a poppet, and a biasing device; a jay-selector comprising: a rotatable jay-piston having jay-slots, and a plurality of ports; and a plurality of flow restrictors.

Additionally or alternatively, the system may include one or more of the following features individually or in combination. The jay-selector may further comprise a fixed guide disposed in the jay-slots. The jay-selector may further comprise a spring. The plurality of ports may be coupled to jay-selector lines capable of conveying fluid from the jay-selector to an injection line. The system may further comprise a backflow prevention valve. The system may further comprise a second pilot valve. The second pilot valve may be coupled to an injection line. At least one of the flow restrictors in the plurality of flow restrictors may be configured to actuate the jay-selector by creating a pressure differential across the flow restrictor.

Provided are systems for chemical injection. An example system comprises a jay-selector comprising: a rotatable jay-piston having jay-slots, and a plurality of ports; and a plurality of flow restrictors.

Additionally or alternatively, the system may include one or more of the following features individually or in combination. The jay-selector may further comprise a fixed guide disposed in the jay-slots. The jay-selector may further comprise a spring. The plurality of ports may be coupled to jay-selector lines capable of conveying fluid from the jay-selector to an injection line. The system may further comprise a backflow prevention valve. At least one of the flow restrictors in the plurality of flow restrictors may be configured to actuate the jay-selector by creating a pressure differential across the flow restrictor.

Provided are methods for chemical injection. An example method comprises flowing a fluid into a chemical line coupled to a pilot valve, The method further comprises increasing the fluid pressure in the chemical line to cause the pilot valve to open; wherein the opening of the pilot valve allows the fluid to flow through the pilot valve. The method additionally comprises flowing the fluid through a jay-selector comprising: a rotatable jay-piston having jay-slots, and a plurality of ports; wherein flowing the fluid through the jay-selector comprises flowing the fluid through at least one of the ports in the plurality of ports. The method also comprises flowing the fluid through a jay-selector line coupled to the at least one of the ports in the plurality of ports; and flowing the fluid through an injection line.

Additionally or alternatively, the system may include one or more of the following features individually or in combination. The fluid may be flowed through a second port in the plurality of ports and a second jay-selector line coupled to the second port in the plurality of ports. The fluid flow through the second port in the plurality of ports and the second jay-selector line coupled to the second port in the plurality of port may increase fluid flow through the injection line. The method may further comprise a second pilot valve. The second pilot valve may be coupled to a second jay-selector line. The method may further comprise a plurality of flow restrictors. At least one of the flow restrictors in the plurality of flow restrictors may be configured to actuate the jay-selector by creating a pressure differential across the flow restrictor. The jay-selector may further comprise a fixed guide disposed in the jay-slots. The jay-selector may further comprise a spring. The plurality of ports may be coupled to jay-selector lines capable of conveying fluid from the jay-selector to an injection line. The method may further comprise a backflow prevention valve. The method may further comprise a second pilot valve. The second pilot valve may be coupled to an injection line.

The preceding description provides various embodiments of the systems and methods disclosed herein which may contain different method steps and alternative combinations of components. It should be understood that, although individual embodiments may be discussed herein, the present disclosure covers all combinations of the disclosed embodiments, including, without limitation, the different component combinations, method step combinations, and properties of the system.

It should be understood that the compositions and methods are described in terms of "comprising," "containing," or "including" various components or steps, the compositions and methods can also "consist essentially of" or "consist of" the various components and steps. Moreover, the indefinite articles "a" or "an," as used in the claims, are defined herein to mean one or more than one of the element that it introduces.

Therefore, the present embodiments are well adapted to attain the ends and advantages mentioned, as well as those that are inherent therein. The particular embodiments disclosed above are illustrative only, as the present invention may be modified and practiced in different but equivalent manners apparent to those skilled in the art having the benefit of the teachings herein. Although individual embodiments are discussed, the invention covers all combinations of all those embodiments. Furthermore, no limitations are intended to the details of construction or design herein shown, other than as described in the claims below. Also, the terms in the claims have their plain, ordinary meaning unless otherwise explicitly and clearly defined by the patentee. It is therefore evident that the particular illustrative embodiments disclosed above may be altered or modified, and all such variations are considered within the scope and spirit of the present invention.

What is claimed is:

1. A system for chemical injection comprising:
    a pilot valve comprising:
        a hydraulic piston,
        a poppet, and
        a biasing device;
    a jay-selector comprising:
        a rotatable jay-piston having jay-slots, and
        a plurality of ports; and
    a plurality of flow restrictors.

2. The system of claim 1, further comprising a second pilot valve.

3. The system of claim 2, wherein the second pilot valve is coupled to an injection line.

4. The system of claim 1, wherein the jay-selector further comprises a fixed guide disposed in the jay-slots.

5. The system of claim 1, wherein the jay-selector further comprises a spring.

6. The system of claim 1, wherein the plurality of ports are coupled to jay-selector lines capable of conveying fluid from the jay-selector to an injection line.

7. The system of claim 1, further comprising a backflow prevention valve.

8. The system of claim 1, wherein at least one of the flow restrictors in the plurality of flow restrictors is configured to actuate the jay-selector by creating a pressure differential across the flow restrictor.

9. The system of claim 1, further comprising an information handling system.

10. The system of claim 1, wherein one of the flow restrictors in the plurality is a single orifice restrictor or a multi-orifice restrictor.

11. A method for chemical injection comprising:
    flowing a fluid into a chemical line coupled to a pilot valve,
    increasing the fluid pressure in the chemical line to cause the pilot valve to open; wherein the opening of the pilot valve allows the fluid to flow through the pilot valve,
    flowing the fluid through a jay-selector comprising:
        a rotatable jay-piston having jay-slots, and
        a plurality of ports; wherein flowing the fluid through the jay-selector comprises flowing the fluid through at least one of the ports in the plurality of ports,
    flowing the fluid through a jay-selector line coupled to the at least one of the ports in the plurality of ports; and
    flowing the fluid through an injection line.

12. The method of claim 11, wherein the fluid is flowed through a second port in the plurality of ports and a second jay-selector line coupled to the second port in the plurality of ports.

13. The method of claim 12, wherein the fluid flow through the second port in the plurality of ports and the second jay-selector line coupled to the second port in the plurality of ports increases fluid flow through the injection line.

14. The method of claim 11, further comprising a second pilot valve.

15. The method of claim 14, wherein the second pilot valve is coupled to a second jay-selector line.

16. The method of claim 11, further comprising a plurality of flow restrictors.

17. The method of claim 16, wherein at least one of the flow restrictors in the plurality of flow restrictors is configured to actuate the jay-selector by creating a pressure differential across the flow restrictor.

18. The method of claim 11, wherein the pilot valve comprises a hydraulic piston, a poppet, and a biasing device.

19. The method of claim 11, wherein the jay-selector further comprises a fixed guide disposed in the jay-slots.

20. The method of claim 11, wherein the jay-selector further comprises a spring.

* * * * *